(12) United States Patent
Alvarez Contreras et al.

(10) Patent No.: US 8,293,205 B2
(45) Date of Patent: Oct. 23, 2012

(54) OBTAINING CATALYSTS OF MMOS$_2$ AND MMOS$_2$ WITH NANOMETRIC ADDITIVE OF SIO$_2$, SYNTHESIZED IN AQUEOUS SOLUTION ASSISTED BY ULTRASOUND

(75) Inventors: Lorena Alvarez Contreras, Chihuahua (MX); Alfredo Aguilar Elguezabal, Chihuahua (MX); Irene Lujan Regalado, Chihuahua (MX); Abril Ibarra Martinez, Chihuahua (MX)

(73) Assignee: Centro de Investigacion en Materiales Avanzados, S.C., Chihuahua (MX)

( * ) Notice: Subject to any disclaimer, the term of this patent is extended or adjusted under 35 U.S.C. 154(b) by 27 days.

(21) Appl. No.: 12/964,054

(22) Filed: Dec. 9, 2010

(65) Prior Publication Data
US 2012/0142519 A1    Jun. 7, 2012

(30) Foreign Application Priority Data
Dec. 3, 2010    (MX) .................. MX/a/2010/013279

(51) Int. Cl.
*B01J 27/051*    (2006.01)

(52) U.S. Cl. .................. 423/561.1; 502/216; 502/222; 502/439

(58) Field of Classification Search ............... 423/561.1; 502/439, 222, 216
See application file for complete search history.

(56) References Cited

U.S. PATENT DOCUMENTS
6,967,185 B2 * 11/2005 Allen et al. ................... 502/216
* cited by examiner

*Primary Examiner* — Timothy Vanoy
(74) *Attorney, Agent, or Firm* — Defillo & Associates, Inc.; Evelyn A. Defillo

(57) ABSTRACT

A method for obtaining a promoted molybdenum sulfide catalyst and a promoted molybdenum sulfide added with a nanometric additive. The obtained catalyst exhibits an improved catalytic activity in hydrotreatment reactions, such as hydrodesulfurization, hydrodenitrogenation, and hydrogenation. The invention presents as an advantage, in addition to a low cost composition by their transition metals content, the activation of thiosalts precursor using an environmentally friendly atmosphere.

7 Claims, 11 Drawing Sheets

OBTAINING CATALYSTS OF MMOS$_2$ AND MMOS$_2$ WITH NANOMETRIC ADDITIVE OF SIO$_2$, SYNTHESIZED IN AQUEOUS SOLUTION ASSISTED BY ULTRASOUND

OBJECTIVE OF THE INVENTION

The present invention provides a simple method for obtaining promoted molybdenum sulfide catalyst (MMoS$_2$) and promoted molybdenum sulfide added with nanometric additive (MMoS$_2$— nanometric oxide) starting off of the synthesis of ammonium thiomolybdate in aqueous solution assisted with ultrasound. The obtained catalysts exhibit an improved catalytic activity mainly in hydrotreatment reactions, hydrodesulfurization, hydrodenitrogenation, and hydrogenation. The synthesis method, described in the present invention, uses catalyst activation phase under a non-toxic gas atmosphere, which makes the method a simple, economic, and low environmental impact choice. The present invention also covers the catalysts obtained with molybdenum sulfide as a base and nanometric oxides particles, with or without promoting with Ni, Co, and other transition metals.

The present invention impact for its application in the commercial context lies at the simplicity of the synthesis method, which will affect the catalyst's cost, as well as the environmental impact reduction from the synthesis, maintaining the catalytic activity of the current commercial catalysts and even featuring, in some cases, superior catalytic activities.

BACKGROUND

In recent years, a greater environmentalist awareness has been generated, from which surged a tendency for the development of investigation directed toward taking care of the environment, mainly for obtaining clean fuel from petroleum refining. Obtaining gasoline and diesel with deep desulfurization is becoming more difficult in view that the crude petroleum contains high contents of sulfur, nitrogen, oxygen, other pollutants, and higher density. On the other hand, environmental regulation tends toward lower levels of sulfur each time. This factor has been, in recent years, the main motor for the great increase in the implementation of catalysts development. The challenges faced by catalyst suppliers are mainly increased, catalytic activity in hydrotreatments (HT) required addressing the specific demands of fuel markets with ultra-low sulfur content (<10 PPM before 2010).

In order to reach the regulated established levels, especially for the sulfur content, it is necessary to have catalytic materials able to be active even with the most refractory molecules present in the different raw materials. To do this, several attempts had been carried out for developing new and more active catalysts with appropriate functionality to produce HDS in these molecules. The strategies include: the use of new active phases such as carbides, nitrides, phosphides, or different transition metal sulfides of Mo and W, promoted with Ni or Co. The operation of these phases continues to be explored for practical uses. The development of various sophisticated synthesis methods, require extreme pressure and temperature conditions and the generation of very complex systems that include tri-metallic catalysts.

Transitional metal sulfides (SMT) have been the more highly used systems due to their exceptional resistance to poisoning, as well as their catalytic characteristic on hydro processing reactions, mainly the catalysts formed by MoS$_2$ or WS$_2$, which should be stable to hydrodesulfurization (HDS) conditions, commonly at temperatures between 300-400° C. and pressure of H$_2$ of 490 psi.

The SMT, which can be supported or unsupported, have been prepared by diverse and very various synthesis methods among emphasize comaceration and homogeneous precipitation. However, the obtained materials, which are generally oxides, hardly reach a complete sulfidation, so the thiosalts precursor decomposition is a very interesting alternative preparation method, which may provide an easy way to achieve a high level of sulfidation in SMT final catalyst. This method may be applied to the development of both material types, meaning, unsupported and supported.

For obtaining supported materials are mainly used as (γ)-alumina, mixed oxides, carbon, zeolites, mesostructured material based silicon oxide, etc. On the other hand, unsupported catalysts or "massic" only contain the active phase of SMT, bi-metallic and more recently as tri-metallic. The second and third metal, commonly referred to as promoters, enhance the catalytic performance of the HT. The transition metal sulfides are commonly promoted with elements of Group VIII B (cobalt and/or nickel) due to the balance between performance and economy. Regardless of the synthesis method used for HDS catalysts preparation, these materials should have specific characteristics such as high catalytic activity, low crystalline degree, or weak crystalline structure, as well as good texture properties, such as high surface area and homogeneous pore size distribution.

Even though supported catalysts are more economically attractive materials for industrial use, in general they are less efficient than the unsupported, because an interaction exists between the metal and the support. This modifies the morphology of the active phase and affects the reducibility to be supplied by the sulfur, among other things. Therefore, there is great interest to develop unsupported catalysts through simple, economic methods with low environment impact.

Recently, G. Alonso, J. Yang, M. H. Siadati and R. R. Chianelli, lnorg Chim Acta, Vol 3 25, (2001), Pages 193-194, G. Alonso, G. Aguirre, I. A. Rivero, S. Fuentes, lnorg. Chim. Act 274 (1998), Page 108, G. Alonso, G. Berhault, lnorg. Chim. Acta 316 (2001), Page 105, L. Alvarez, J. Espino, C. Ornelas, J. L. Rico, M. T. Cortez, G. Berhault and G. Alonso, J. of Mol. Catal. A: Chemical, Vol 210, (2004), page 105-117, G. Alonso, V. Petranovskii, M. Del Valle, J. Cruz-Reyes, a. Licea-Claverie, S. Fuentes, Appl. Catly A: Gral (2000), 1997, Pags. (87-90), prepared unsupported HDS catalysts based on the thiometalatos tetraalkylamonium synthesis. This synthesis is based on the methodology developed by J. W. McDonald, G. D. Friesen, I. D. Rosehein, W. E. Newton, lnorg, Chem. ACTA 72 (1983), Page. 205, for the ammonium thyomolybdate synthesis (ATM) in aqueous solution, which subsequently is reacted with tetraalkylamonium salts to increase the catalyst surface area after its activation. Generally, the generated thiosalts are activated by using different routes such as: in situ activation, where the activation takes place simultaneously with the application or on extremely high hydrogen pressure conditions (up to 2000 psi); while activation ex situ, involves the previous decomposition of the precursors before the HDS reaction, which takes place at atmospheric pressure under a specific gas mixture flow (mainly H$_2$S/H$_2$) at typical temperatures of 300-500° C. These synthesis and activation methods, widely reported, have some important disadvantages: the synthesis departs from costly molecules such as the salts of tetraalkylammonium, while in activation, the via in situ requires extreme pressure conditions to achieve good catalytic activities, on the other hand the ex situ way, requires a mixture of gases which includes H₂S known for its high toxicity and environmental impact.

Among the more active commercial unsupported catalysts in hydrodesulfurization are trimetallic materials composed by Ni—Mo—W (NEBULA and STAR catalyst developed by Exxon Mobil-Albemarle), in the case of NEBULA has been reported that presents a great activity (up to three times that of any other catalytic system, $K_{NEBULA} \approx 31.2 \times 10^{-7}$ mol $g^{-1}$ $s^{-1}$, evaluated in a reactor by batch at 350° C. and 490 psi) and high HDS stability. Even if the technological contribution of these materials is obvious, it is important to highlight that its use significantly increases the production cost for clean fuels, so its use is limited to certain beds or layers of the catalyst bed, which mission is to treat flows having high content of nitrogen compounds, the following layers are filled with cheaper materials, generally supported, that allow an overall result that complies with regulations.

It is so obvious, the need for efficient and low-cost materials. In this light, Y. Gochi-Ponce, I. Alvarez-Contreras, f. Paraguay-Delgado and g. Alonso-Núñnez, Int. J. Materials and Product Technology, Vol. 27, Nos. 1/2 (2006), Pages 130-140, reported trimetallic catalysts Ni—Mo—W with 5, 25, and 50% by weight of $AL_2O_3$, using a multiple stage synthesis method with strict pH control, followed by calcination, and subsequent ex situ activation phase at 400° C. in the presence of a dimethyl-disulfide mixture (DMDS)/$N_2$. This method is an alternative that prevents the use of high pressure for the generation of non-supported trimetallic catalysts. However, complex synthesis coupled with the use of DMDS, which may be fatal if inhaled, is highly toxic and irritating in contact with the skin and respiratory tract; creates a strong disadvantage.

In summary, environmental regulations continually diminish the permitted level of emissions, which requires the generation of more efficient HDS catalytic systems. Today the most widely used catalysts at the industrial level are based on SMT, generally supported in $Al_2O_3$. Its great use is based on its low cost. However, considering the effectiveness required for sulfur removal, the most suitable option is the use of non-supported catalysts, which to be efficient normally requires complicated synthesis methods and compositions with a high metal content, which increases its cost and reduces the feasibility use. In this framework, a simple, safe, economic and environmentally friendly method to allow having competent catalytic materials with those obtained today by more complex methods, offers unsuspected possibilities from the industrial application point of view. Thus, the present invention from the commercial point of view, presents advantages when considering the simplicity of the synthesis method, which will affect the catalyst cost, as well as the reduction of the environmental impact from the synthesis.

There are currently some patents describing methods for obtaining unsupported catalysts. In the description of such patents the high metal content of the catalytic is evident (with the consequent high cost) and the severe conditions required for the catalytic activation. The patents are as follows:

In the U.S. Pat. Nos. 6,299,760; 6,156,695; 6,783,663; 6,712,955 and 6,758,963 disclose preparation methods and the implementation of new unsupported catalysts NiMoW. It was found that new NiMoW catalysts exhibited a HDS activity three times higher than a commercial catalyst. The catalyst preparation method forms the NiMoW precursor using ammonia as a chelating agent, followed by calcination, and sulfuretion of the final NiMoW catalyst. The preparation method has several disadvantages such as the use of concentrated aqueous ammonia that causes environmental pollution and the synthesis method involves a high preparation cost of the catalysts.

U.S. Pat. No. 7,223,713 B2 describes a producing method for molybdenum disulfide catalysts ($MoS_2$) and molybdenum disulfide with carbon, containing ($MoS_{2-x}C_x$) that show high values of surface area due to the hydrothermal processes involved in the synthesis. The catalysts are formed from precursor salts with the general formula $A_xMoS_4$, where A is an ammonium ion or tetraalkylammonium (x is 2 for each case). The obtained molybdenum disulfide can be used alone or with promoters such as cobalt, ruthenium, iron or nickel. The $MoS_2$ can be obtained in aqueous solutions or a mixture of aqueous and organic compounds under hydrothermal conditions. The process is suitable for large scale implementations such as batch reactors at high pressures (100-2000 psi) to 300 or 400° C.

The U.S. Pat. No. 7,132,386 B2 describes a technique to improve the mass production of amorphous type sieve material which, among other things, are very useful as catalysts for a wide variety of applications such as a hydrotreatment process. The catalysts are obtained in aqueous solution of ammonium thiomolybdates and tetraalkylammonium salts activated under pressure from 20 up to 4950 psi. The disadvantage is the cost of reagents for the precursor's generation and activation under high pressure conditions that generally increase the cost of obtained material and limits their industrial exploitation.

Patent United States No. 7,687,430 B2 describes a preparation process for a solution consisting of at least one cobalt or nickel salt, in at least one heteropolyanion combined with molybdenum and cobalt or molybdenum and nickel in its structure, the preparation process includes: a) the mixture for at least one molybdenum source and at least one oxidizing compound in aqueous solution for synthesizing paramolybdate ions in acid pH, with a molar relation range of 0.1 to 20; b) introduction of at least one cobalt precursor and/or at least one nickel precursor in the solution a) with a molar ratio (Ni+Co)/Mo between 0.25 and 0.85.

The United States Patent Application Publication No. 2009/0145808 A1 describes a process catalyst synthesis for hydrodesulfurization by spray pyrolysis. The catalyst particles may include at least one metal selects between molybdenum, cobalt or nickel and a carbon dioxide support. The spray pyrolysis technique allows obtaining catalytic particles with high loading catalyst on the substrate. The support may be Aerosil 300, among others.

The United States Patent Application Publication No. 2010/0193402 A1 describes a catalyst composed of metal oxide, having a particle size of 10 nm to 100 nm and the reactive species have a structure containing multi-metallic oxides, consisting of one metal of the group VIII and two metals of the group VIB, wherein the molar ratio of the metal of Group VIII to the metal of group VIB metal is 1:9 to 9:1 preferably 1:6 to 6:1 and more preferably 1:4 to 4:1 and the molar relationship between the two metals of group VIB is 1:5 to 5:1, preferably 1:3 to 3:1, more preferably of 1:2 to 2:1. Another aspect that describes this application is a method for obtaining a catalyst with multiple phases which include the formation of an aqueous suspension of a carbonate of the metal group, formation of aqueous salts solution of metals of group VIB adding a surfactant. The disadvantage is that there is a relatively long method that involves the surfactants use and various thermal treatments.

The United States Patent Application Publication No. 2010/0210741 A1 describes a method for obtaining and a catalyst composition based on cobalt molybdenum sulfide, although the implementation of this catalyst is directed to the production of stable alcohol from synthesis gas.

DETAILED DESCRIPTION OF THE INVENTION

Figure 1:
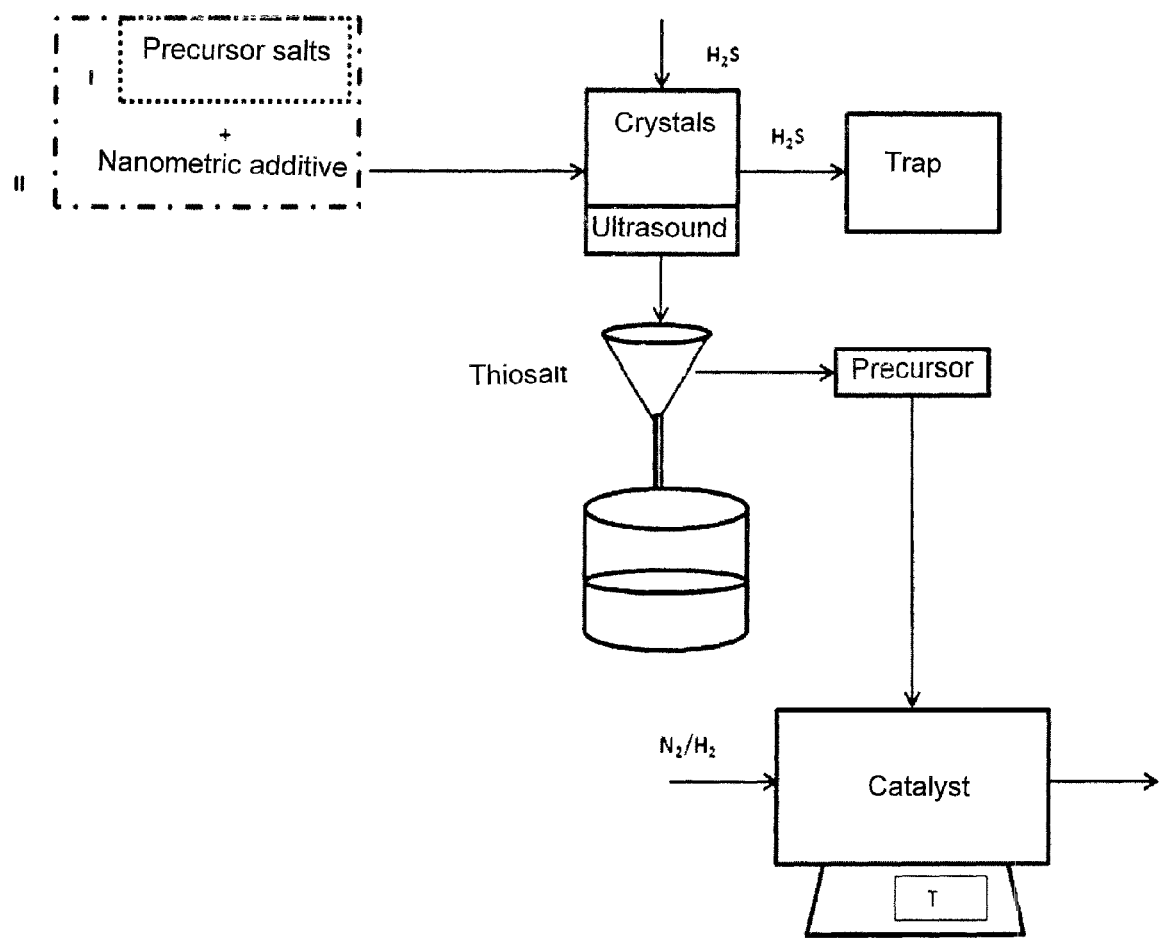
FIG. 1 illustrates a schematic representation of the catalyst synthesis method.
Figure 2A:
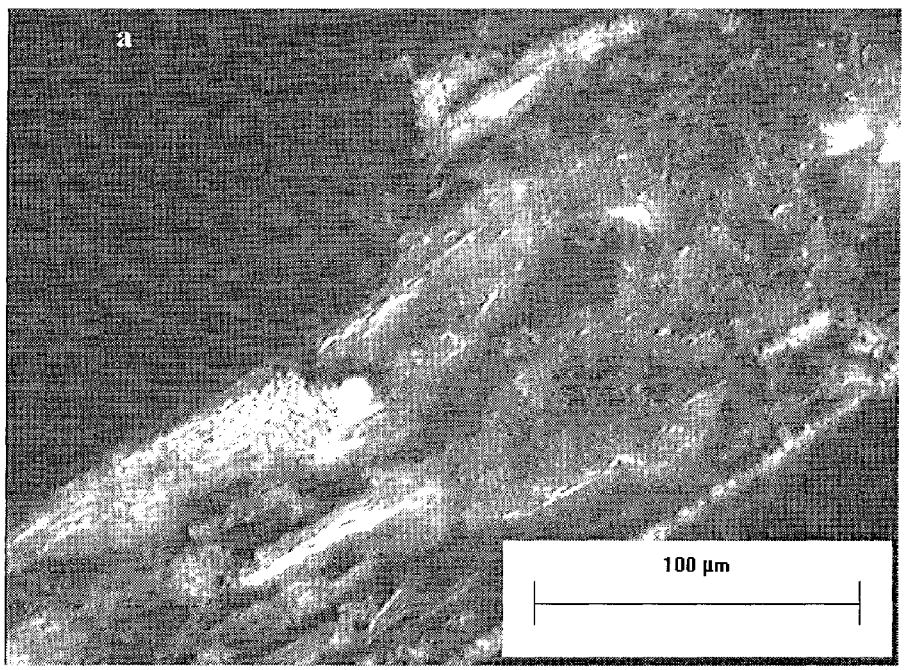
FIG. 2A is an optical microscope micrograph that shows the thiosalts precursor crystals obtained by the traditional method and 2B with the synthesis method of the present invention.
Figure 2:
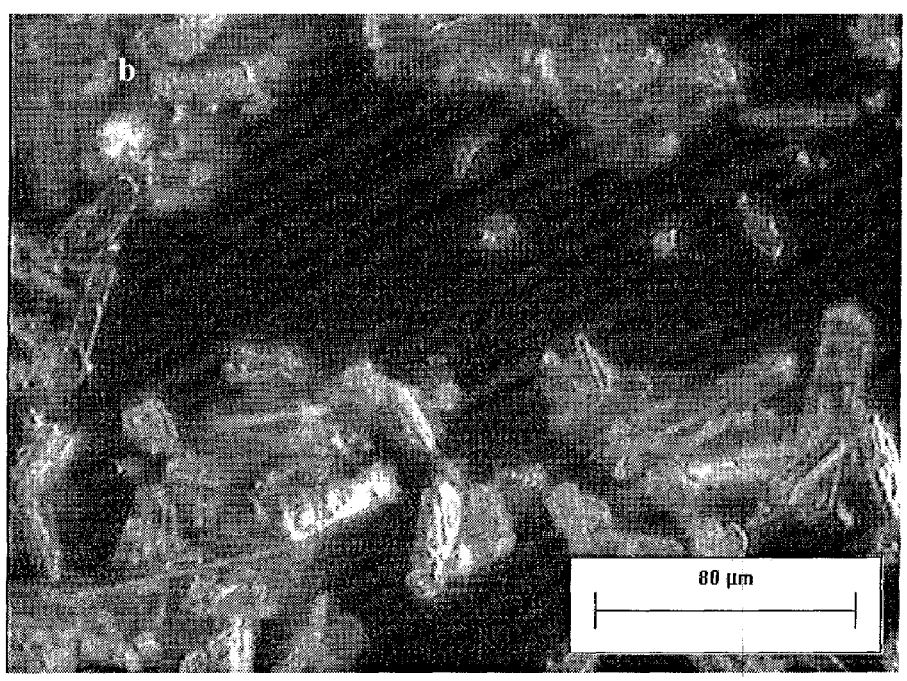
Figure 3:
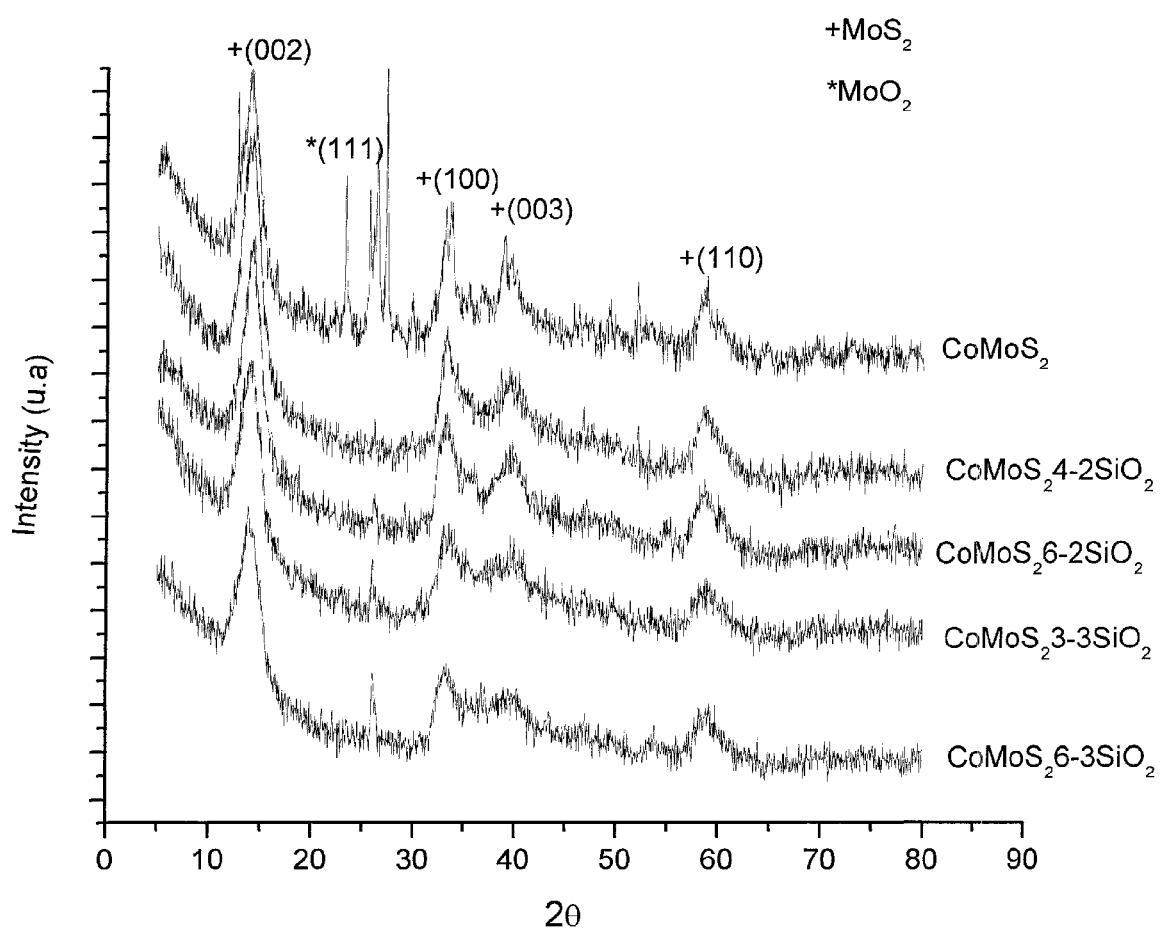
FIG. 3 is a graphic of the X-rays diffraction patterns of catalysts $CoMoS_2$—$SiO_2$ with a $R_{Co}$=0.3 and different molar relationships Si/Mo.
Figure 4:
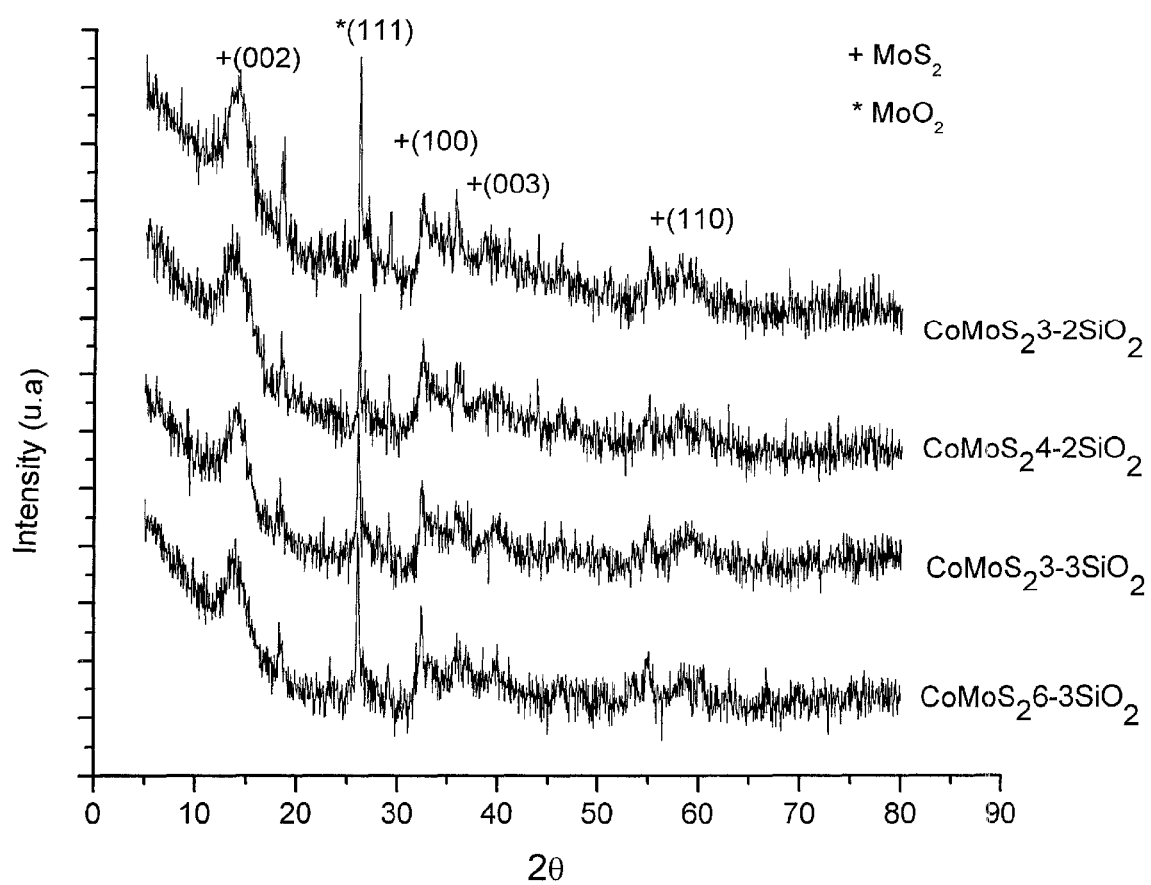
FIG. 4 is a graphic of the X-rays diffraction patterns of catalysts $CoMoS_2$—$SiO_2$ with a $R_{Co}$=0.5 and different molar relationships Si/Mo.
Figure 5:
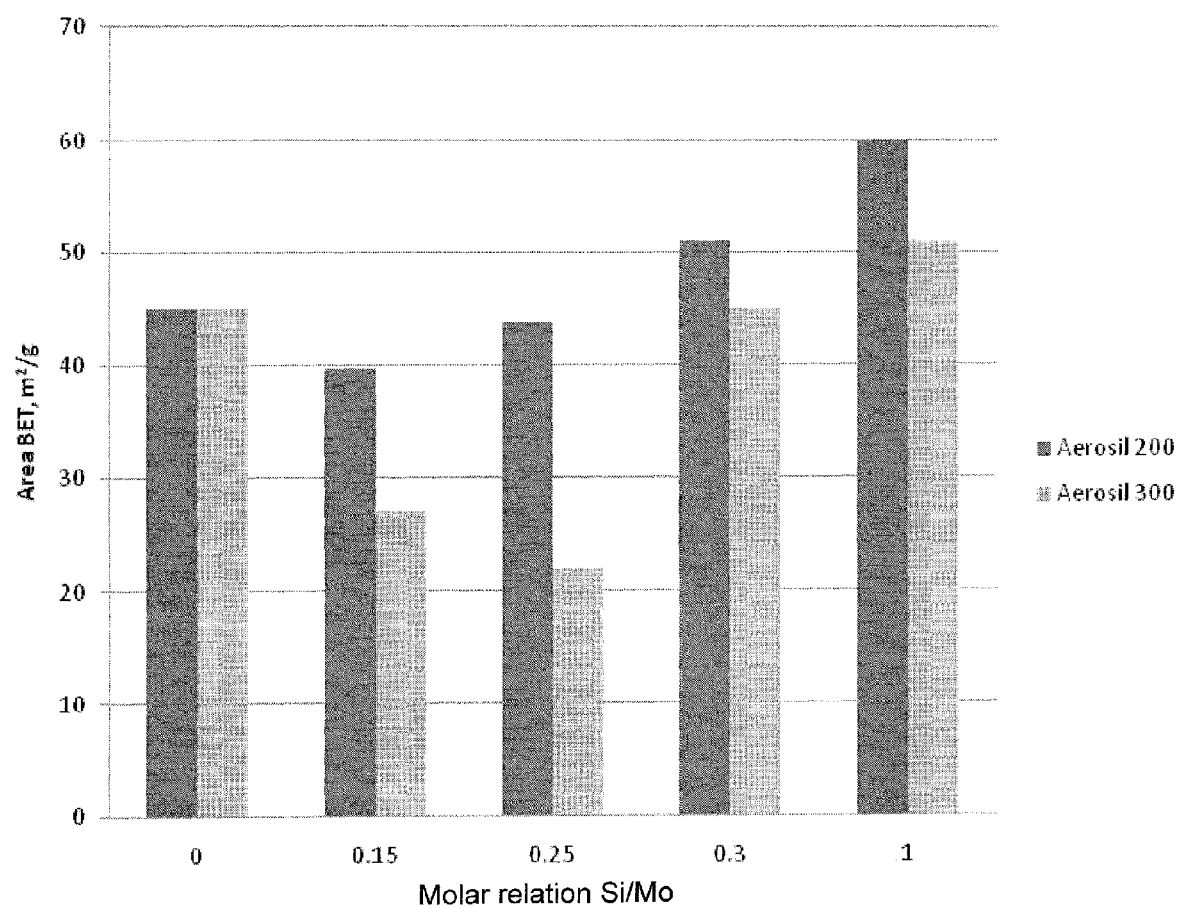
FIG. 5 is a graphic of the specific surface area value of the catalysts $CoMoS_2$—$SiO_2$ with a $R_{Co}$=0.3 and different molar relationships Si/Mo.
Figure 6:
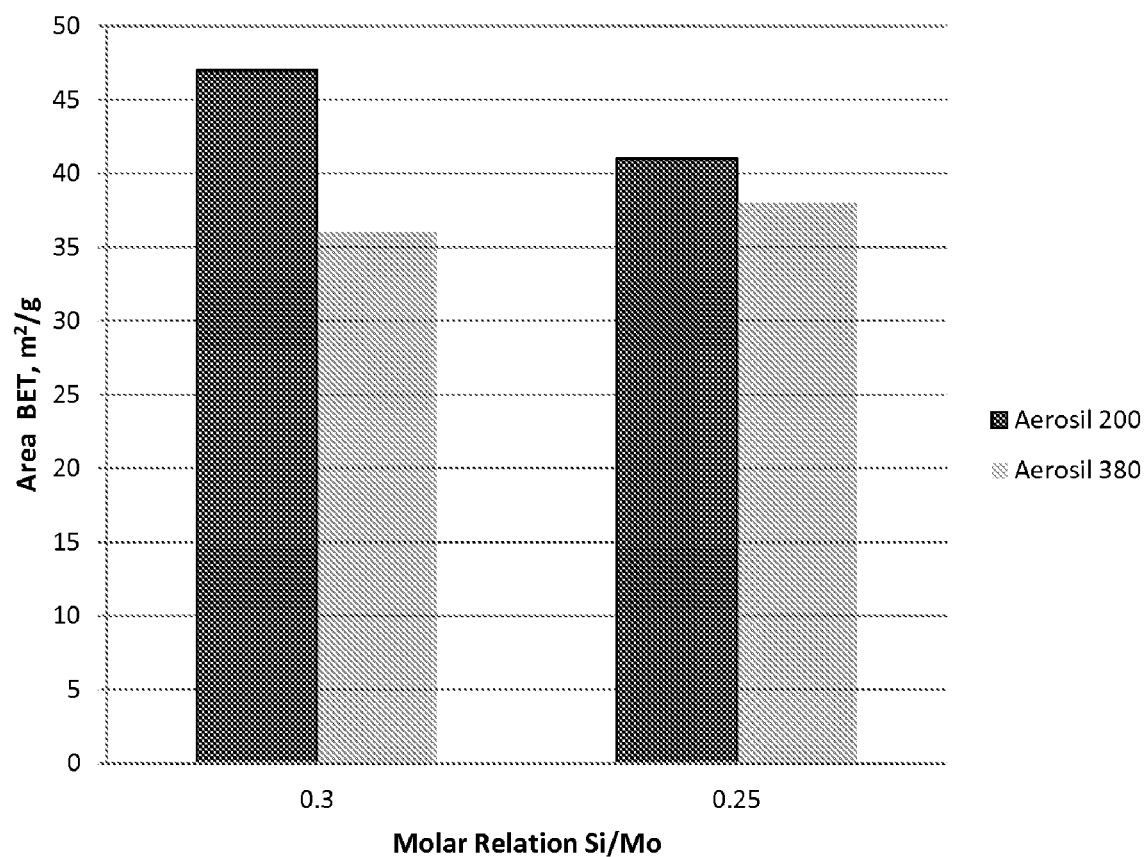
FIG. 6 is a graphic of the specific surface area values of catalysts $CoMoS_2$—$SiO_2$ with a $R_{Co}$=0.5 and different molar relationships Si/Mo.

The present invention relates to a catalyst synthesis method based on promoted transition metal sulfide, with added nanometric particles. The method represents a simple methodology that departs with obtaining metals transition thiosalts precursors in aqueous solution assisted with ultrasound as it can be seen in the schematic drawing of FIG. 1, that allows the entry, reducing the precursor crystals size by 10 times with respect to the traditional method as shown in the micrographic of FIGS. 2A and 2B.

To obtain the precursor thiosalt, a Group VIB transition metal inorganic salt (ammonium heptametalatos of Mo, W, etc.) is used with Group VIIIB transition metal inorganic salt (nitrate of Co, Ni, Ru, etc) in $NH_4OH$ solution and water (3:1 vol), the atomic relationship of Group VIIIB transition metal with respect to the Group VIB metal VIIIB/(VIIIB+VIB) may be from 0.01 to 1, preferably 0.3 to 0.5. The nanometric agent includes spherical oxide particles (silicon, aluminum, titanium, zirconium, magnesium) with sizes of 30 nm or less, which has molar relationships with respect to the group VIB transition metal from 0 to 1:–1. The produced mixture is subjected to ultrasound for 20 to 60 min, preferably 30 minutes. The sonification is a bath, therefore the sonification frequency required is not very high.

The sonification time is used at this phase to ensure the dispersion of nanometric additive particles. A mechanical or magnetic high speed agitation system may be used, although the use of ultrasound is more efficient.

The synthesis of precursor thiosalt is carried out in the ultrasonic bath at ambient temperature and pressure. The thiosalt crystals are formed with the bubbling of $H_2S$ at low flow of 0.2-0.5 mL/s in the mixture solution. The nanometric additive and ultrasonic mixing reduces or inhibits the growth of thiosalt crystals. The $H_2S$ bubbling time may be 1 to 4 hours, preferably 2 hours. Ending the bubbling period, an aging period is given which could be from 1 to 36 hours, preferably 24 hours. The solids of the thiosalt crystals are filtered and dried at a temperature between 25 and 80° C. for two hours, preferably 80° C.

The dried precursor thiosalt are activated ex situ, using any oven that allows a gas flow admission. The temperature may range from 350° C. to 550° C., preferably 400-450° C., at a pressure of 1 atm in a controlled atmosphere. Normally, at this stage, a reducing atmosphere is used having a mixture of gases formed by $H_2S/H_2$, however—the risk is well known in the use of $H_2S$, by taking advantage of the high sulfur content of the thiosalt precusor, the present invention proposes a safer atmosphere, economically and environmentally friendly by using a mixture of $N_2/H_2$ (90:10% vol).

The method comprises the steps of:

placing in a container a nanometric agent (spherical oxides particles, e.g. silicon, aluminum, titanium, zirconium, magnesium or mixtures thereof), adding $NH_4OH$ and water (vol 3-1) and sonicated for 20 to 60 minutes in an ultrasonic bath. Subsequently adding a Group VIB transition metal inorganic salt (ammonium heptametalatos of Mo, W, etc.) with a Group VIIIB transition metal inorganic (nitrate Co, Ni, Ru, etc). The atomic relationship of the Group VIIIB transition metal with respect to the Group VIB metal {VIIIB/(VIIIB+VIB)} may range from 0 to 1, preferably 0.3 to 0.5, the molar relationships with respect to the group VIB transition metal is from 0 to 1:1

Sealing the container and bubbling $H_2S$ flow of 0.2-0.5 mL/s for 2 hours in the ultrasonic bath. A trap system is mounted containing an aqueous solution of NaOH to the output of the reaction container in order to neutralize the $H_2S$, which did not react. The thiosalt crystals are aged for 24 hours.

Finishing the aging period, the thiosalts are filtered and dried at a temperature between 25 and 80° C. for 2 hours.

The activation is carried out using an oven at a temperature from 350° C. to 550° C., preferably 400-450° C., at a pressure of 1 atm in a controlled atmosphere. Normally, at this stage a reducing atmosphere is used including a gas mixture formed by $H_2S/H_2$, however considering the risk of the use of $H_2S$, advantage is taken of the high sulfur content in the thiosalt used as a precursor, and the treatment is carried out on a more secure, economic and environmentally friendly atmosphere using a mixture of $N_2/H_2$ (90:10% vol).

Figure 7:
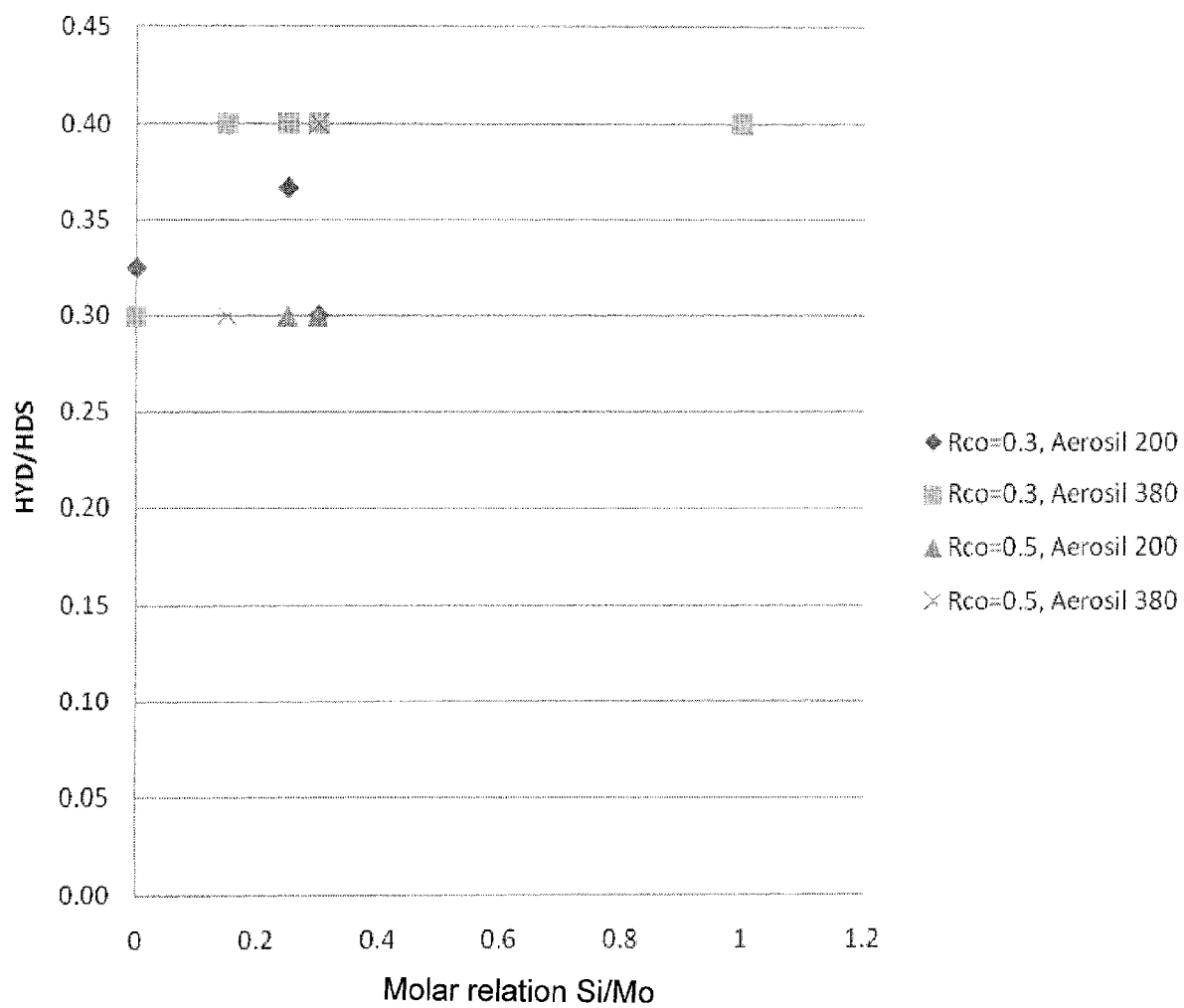
FIG. 7 is a selectivity graphic of the reaction HDS of DBT reaction at 350° C. and 490 psi of the catalysts $CoMoS_2$—$SiO_2$ with different $R_{Co}$ and molar relationships Si/Mo.

The catalysts are characterized by different techniques and to carry out the assessment of their catalytic performance they were tested in the reaction of hydrodesulfurization (HDS) using the model molecule of dibenzothiophene (DBT). The catalyst was introduced inside a high pressure batch reactor Parr 4520, with the DBT solution and the mixture of cis and trans decahydronaphalene (decalin). This hydrocarbon mixture was prepared with concentrations of 2.5 and 5% of DBT. The reactor was pressurized to 490 psi of $H_2$, heated the room temperature to 350° C. and with mechanical agitation of 600 rpm. The progress of the reaction was monitored by samples collected in the liquid phase, taken from the reactor every 30 minutes during the reaction time; these samples are placed in small vials, which were analyzed by gas chromatography, with the purpose of determining the speed reaction constant. The samples were analyzed in a chromatograph by Perkin-Elmer model Auto System XL, fitted with packed column OV-17 3%. These conditions were also tested for commercial catalysts. The results of the reaction are summarized in the graphs in FIGS. 7 and 8.

The synthesized product showed a good specific surface area and low crystalline degree, as shown in the graphs in FIGS. 3-6. The analysis of the product through scanning electron microscopy and electron transmission microscopy showed the morphology formation of the agglomerates of particles and the characteristic stacking of the transition metal sulfides as it can be seen in the micrographs of FIGS. 9-12. Catalytic tests showed attractive results related to selectivity and constant reaction rate in HDS of DBT at the test conditions.

EXAMPLES

Figure 9:
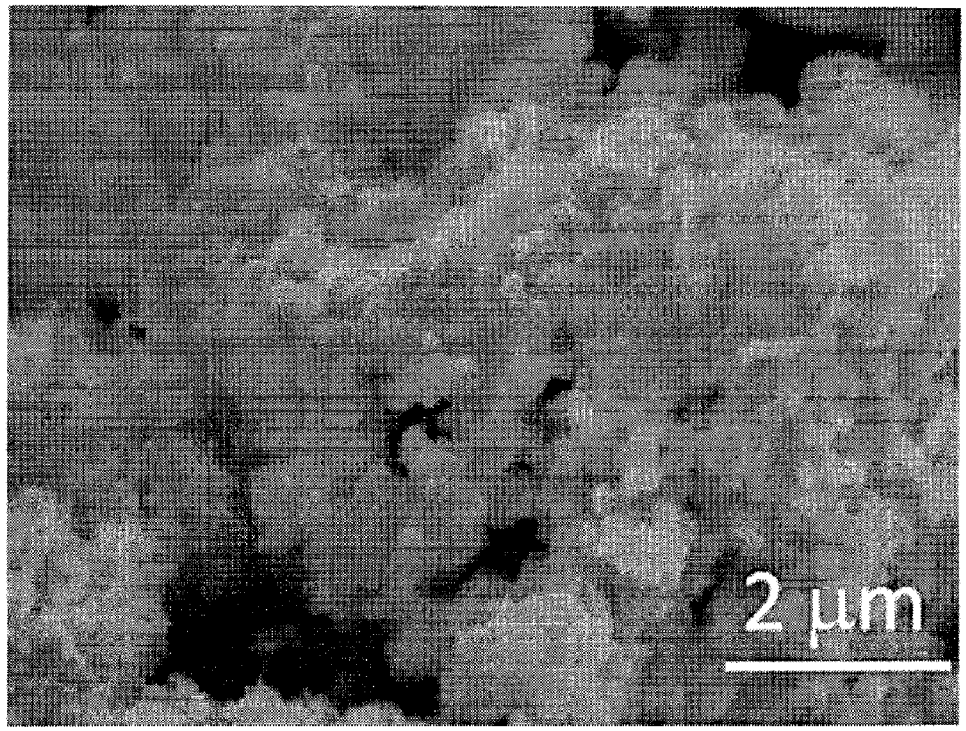
FIG. 9 is a scanning electron microscope micrograph that shows the morphology characteristic of the type I catalyst.

The synthesis method of promoted molybdenum sulfide catalyst (MMoS$_2$) in aqueous solution assisted with ultrasound:

In a flask add NH$_4$OH and water, dissolve a salt of H$_{24}$Mo$_7$N$_6$O$_{24}$:4 H$_2$O. Place the solution in ultrasound for 30 min, then add Co(NO$_3$)$_2$. Once the cobalt salt is dissolved, bubble H$_2$S for two hours and let it rest at room temperature for 24 hours. Filtering the crystals and dried to 80° C. for 2 hours. Subsequently, precursor thiosalt is activated ex situ in a tubular oven at 400° C. for 2 hours in a stream of N$_2$/H$_2$ (90:10% vol). The morphology of the type I catalyst is shown in FIG. 9.

Figure 10:
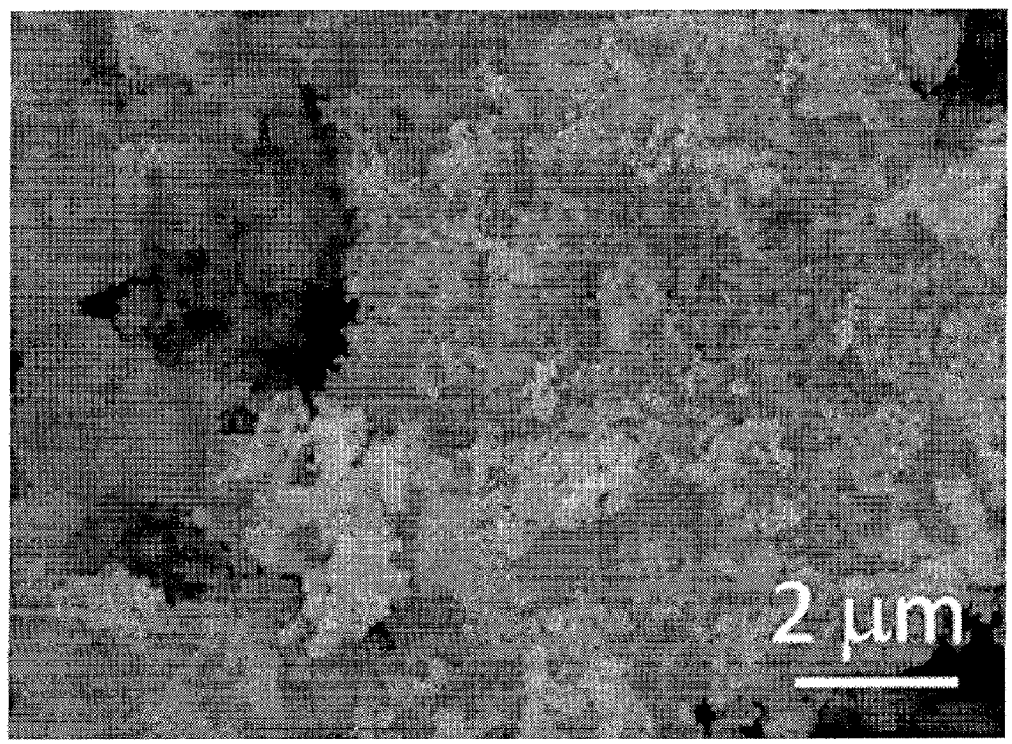
FIG. 10 is a scanning electron microscope micrograph that shows the morphology characteristic of the type II catalyst with an intermediate molar ratio Si/Mo of 0.25.
Figure 11:
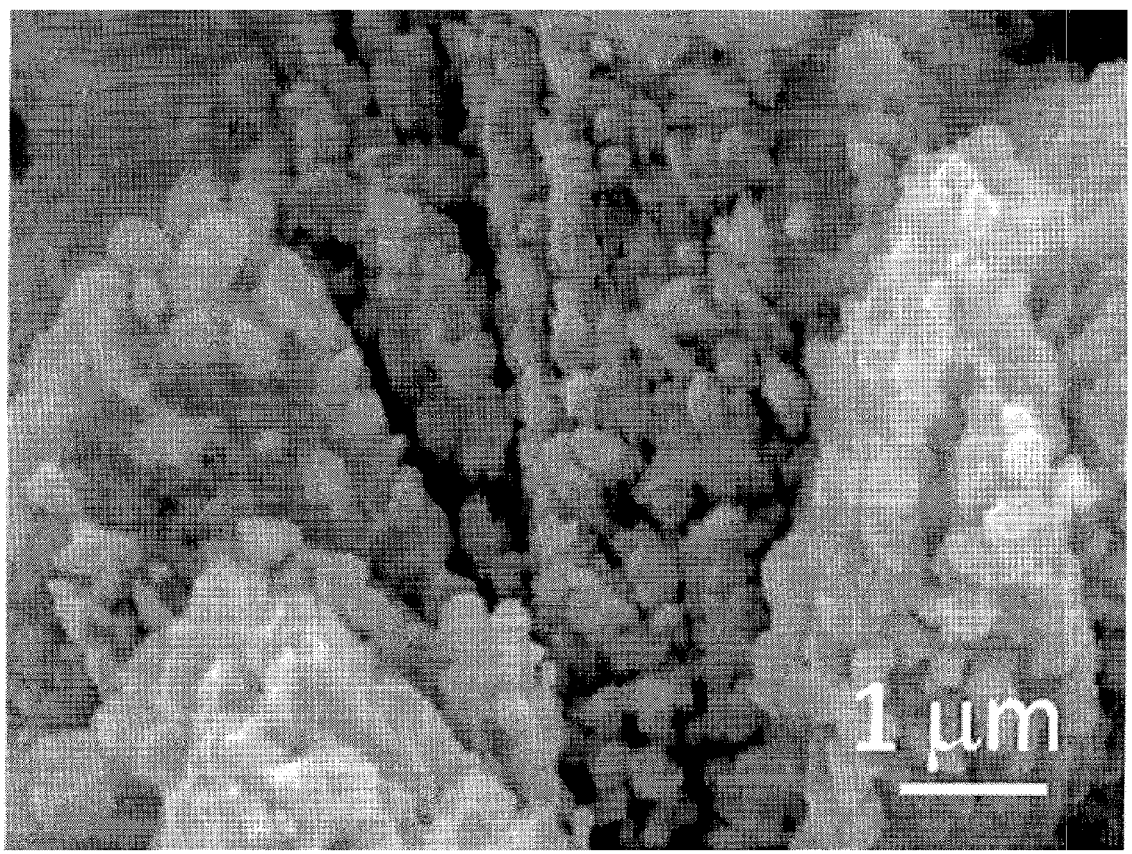
FIG. 11 is a scanning electron microscope (SEM) micrograph that shows the morphology characteristic of type II catalyst with a molar ratio Si/Mo of 1.
Figure 12:
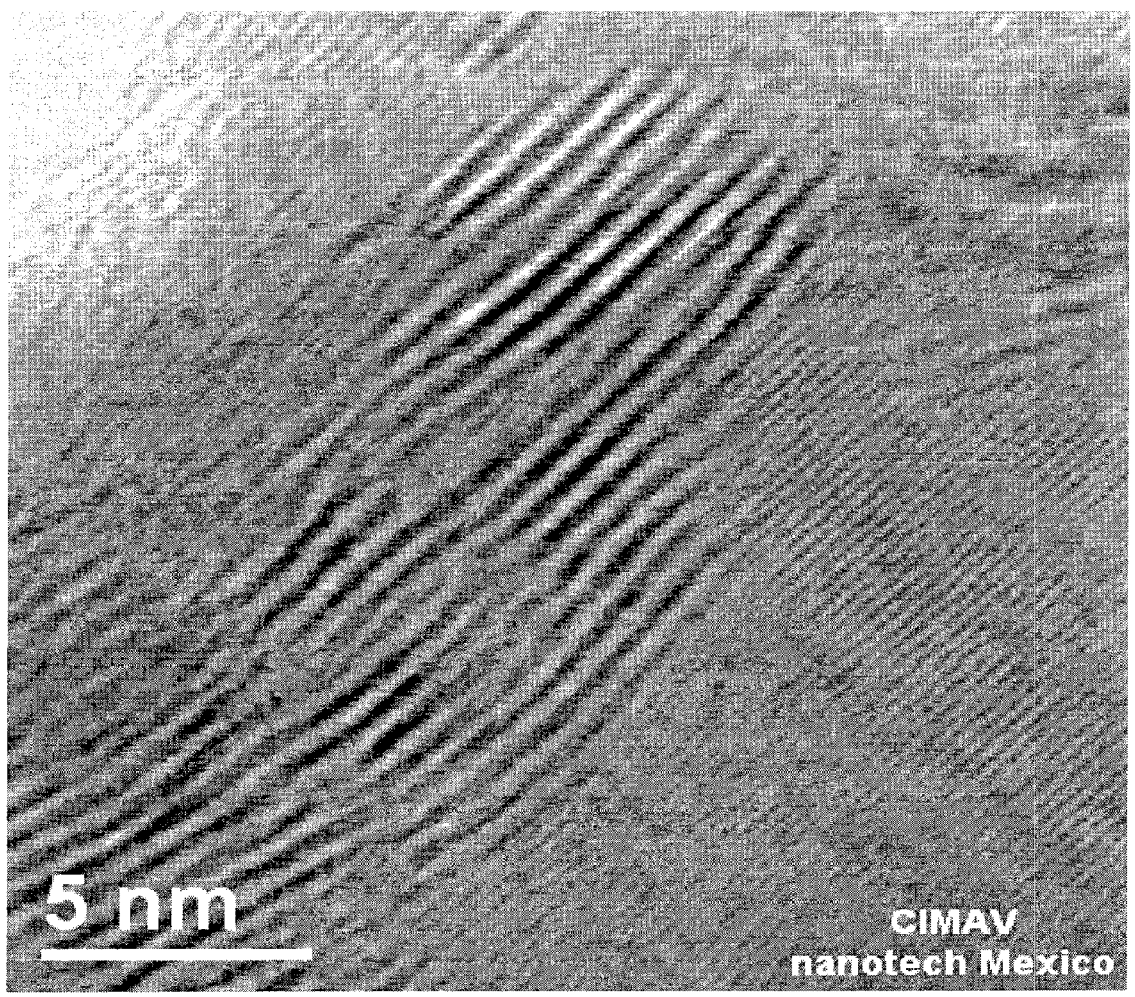
FIG. 12 is a microscope transmission micrograph showing the stacking of strips characteristic of the $MoS_2$ structure.

2. The synthesis method of promoted molybdenum sulfide catalyst promoted by adding a nanometric additive (MMoS$_2$—SiO$_2$) in aqueous solution assisted with ultrasound:

In a flask, add the nanometric additive (Aerosil 200 or 380), NH$_4$OH, and water, dissolves a salt of H$_{24}$Mo$_7$N$_6$O$_{24}$:4 H$_2$O. Placing the solution in Ultrasound for 30 min, then add Co(NO$_3$)$_2$. Once cobalt salt is dissolved, bubble H$_{2S}$ for two hours and let stand at room temperature for 24 hours. The crystals are filtered and dried to 80° C. for 2 hours. Subsequently, the precursor thiosalt is activated so ex situ in a tubular oven at 400° C. for 2 hours in a stream of N$_2$/H$_2$ (90:10% vol). The morphology of the type II catalyst is shown in FIGS. 10-11.

Figure 8:
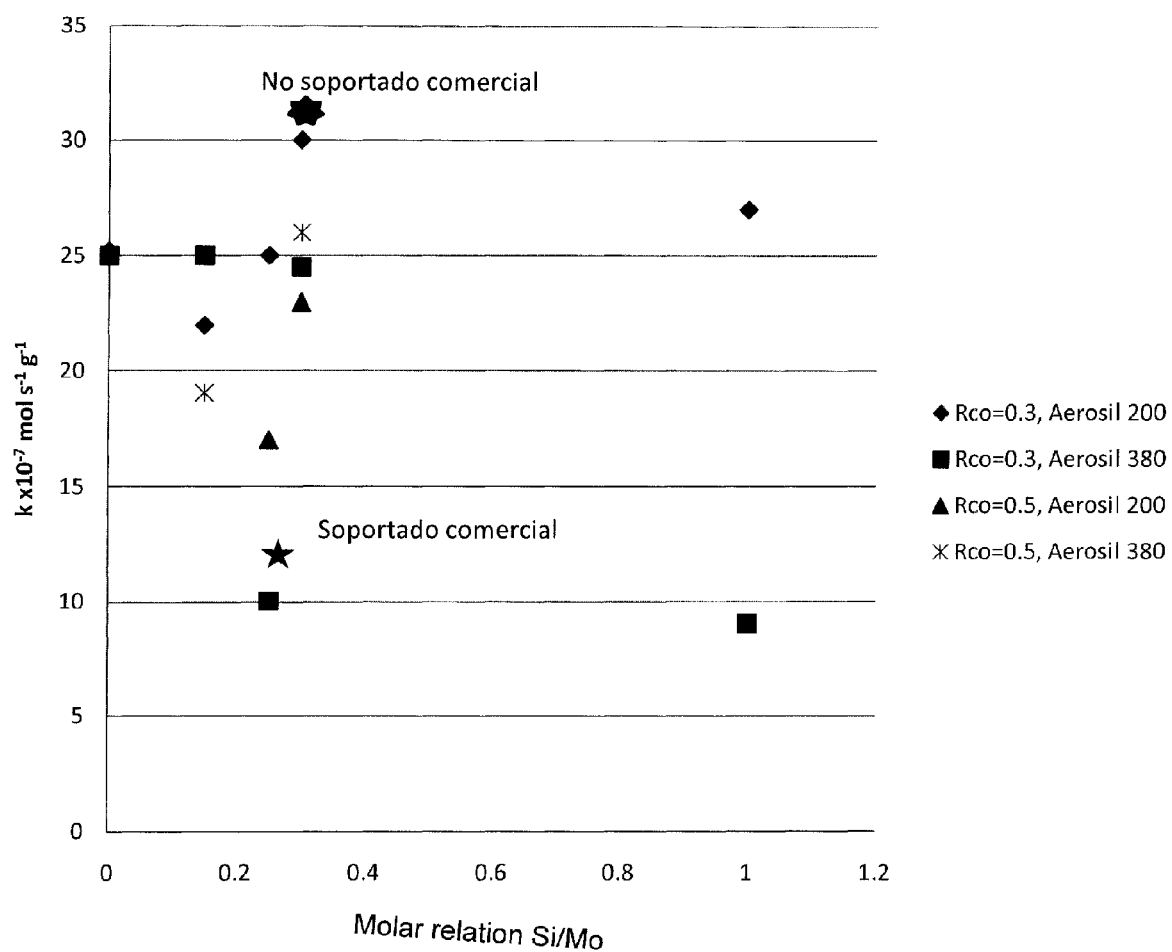
FIG. 8 is a catalytic activity graph in the HDS of DBT reaction at 350° C. and 490 psi of the catalysts for catalytic $CoMoS_2$—$SiO_2$ with different $R_{Co}$ and molar relationships Si/Mo.

FIG. 8 shows the catalysts by the present invention have an excellent performance in the reaction of hydrotreatment.

What is claimed is:

1. A method for obtaining a promoted molybdenum sulfide catalyst and a promoted molybdenum sulfide added with a nanometric additive, the method comprising the steps of:

mixing a salt of H$_{24}$Mo$_7$N$_6$O$_{24}$:4 H$_2$O with NH$_4$OH, and water to form a mixture;

sonificating the mixture in an ultrasonic bath;

adding a group VIB metal transition inorganic salt and a group VIIIB transition metal inorganic salt;

bubbling a flow of H$_2$S in the ultrasonic bath to form thiosalt crystals;

aging the thiosalt crystals;

and filtering and drying the thiosalt crystals, wherein a nanometric agent is further added in the mixing step to obtain the promoted molybdenum sulfide added with a nanometric additive.

2. The method according to claim 1, wherein the nanometric agent is selected from silicon, aluminum, titanium, zirconium, or magnesium; wherein the group VIB metal transition inorganic salt is H$_{24}$Mo$_7$N$_6$O$_{24}$:4 H$_2$O; and wherein the Group VIIIB transition metal inorganic salt is Co(NO$_3$)$_2$.

3. The method according to claim 1, further including the step of activating the catalyst under a non-toxic gas atmosphere.

4. The method according to claim 3, wherein the non-toxic gas atmosphere includes a gas mixture of N$_2$/H$_2$.

5. The method according to claim 1, wherein the catalyst is obtained based on molybdenum sulfide with oxides nano particles promoted and non-promoted with Ni or Co.

6. The method according to claim 1, wherein the group VIIIB transition metal with respect to the group VIB metal has an atomic relationship between 0.3 to 0.5.

7. The method according to claim 1, wherein the group VIIIB transition metal with respect to the group VIB metal has a molar ratio between 0 and 1:1.

* * * * *